US010574060B2

(12) United States Patent
Raji et al.

(10) Patent No.: US 10,574,060 B2
(45) Date of Patent: Feb. 25, 2020

(54) INTELLIGENT POWER SUPPLY AND TRANSFORMATION FOR USER DEVICES

(71) Applicant: iControl Networks, Inc., Philadelphia, PA (US)

(72) Inventors: Reza Raji, Houston, TX (US); Paul Dawes, Redwood City, CA (US)

(73) Assignee: iControl Networks, Inc., Philadelphia, PA (US)

( * ) Notice: Subject to any disclaimer, the term of this patent is extended or adjusted under 35 U.S.C. 154(b) by 0 days.

(21) Appl. No.: 16/039,033

(22) Filed: Jul. 18, 2018

(65) Prior Publication Data

US 2019/0081484 A1 Mar. 14, 2019

Related U.S. Application Data

(63) Continuation of application No. 14/852,781, filed on Sep. 14, 2015, now Pat. No. 10,056,761, which is a (Continued)

(51) Int. Cl.

*H02J 4/00* (2006.01)
*H05B 37/02* (2006.01)

(Continued)

(52) U.S. Cl.

CPC .................. *H02J 4/00* (2013.01); *H04B 3/54* (2013.01); *H04L 12/10* (2013.01);

(Continued)

(58) Field of Classification Search

CPC ..... H02J 4/00; H04B 3/54; H04B 2203/5441; H04B 2203/5445; H04L 12/10; H05B 37/0263; Y10T 307/406

See application file for complete search history.

(56) References Cited

U.S. PATENT DOCUMENTS 4,754,261 A 6/1988 Marino
4,779,007 A 10/1988 Schlanger et al.

(Continued)

FOREIGN PATENT DOCUMENTS

JP 2003-085258 A 3/2003
JP 2003-141659 A 5/2003

(Continued)

OTHER PUBLICATIONS

X10—ActiveHome, Home Automation Made Easy [retrieved on Nov. 4, 2003], 3 pages.

(Continued)

*Primary Examiner* — Robert L Deberadinis
(74) *Attorney, Agent, or Firm* — BakerHostetler

(57) ABSTRACT

Systems and methods are disclosed for intelligent power supply for user devices. An example transformer may comprise a plurality of output terminals. Each of the output terminals may be associated with a different voltage. A regulator device may be in communication with the transformer and with a user device. The regulator device may determine a power requirement of the user device. Based on the power requirement of the user device, the regulator device may determine one of the output terminals of the transformer. The regulator device may cause output, to the user device and from the determined output terminal, of a signal.

20 Claims, 4 Drawing Sheets

Related U.S. Application Data continuation of application No. 13/099,293, filed on May 2, 2011, now Pat. No. 9,144,143.

(60) Provisional application No. 61/329,610, filed on Apr. 30, 2010.

(51) Int. Cl.
*H04B 3/54* (2006.01)
*H04L 12/10* (2006.01)

(52) U.S. Cl.
CPC . *H05B 37/0263* (2013.01); *H04B 2203/5441* (2013.01); *H04B 2203/5445* (2013.01); *Y10T 307/406* (2015.04)

(56) References Cited

U.S. PATENT DOCUMENTS 4,833,449 A 5/1989 Gaffigan
4,860,185 A 8/1989 Brewer et al.
4,993,059 A 2/1991 Smith et al.
5,086,385 A 2/1992 Launey et al.
5,519,878 A 5/1996 Dolin, Jr.
5,579,197 A 11/1996 Mengelt et al.
5,907,279 A 5/1999 Bruins et al.
5,963,916 A 10/1999 Kaplan
D416,910 S 11/1999 Vasquez
5,991,795 A 11/1999 Howard et al.
6,037,991 A 3/2000 Thro et al.
6,052,052 A 4/2000 Delmonaco
6,060,994 A 5/2000 Chen
6,134,591 A 10/2000 Nickles
6,140,987 A 10/2000 Stein et al.
6,198,475 B1 3/2001 Kunimatsu et al.
6,198,479 B1 3/2001 Humpleman et al.
6,219,677 B1 4/2001 Howard
6,281,790 B1 8/2001 Kimmel et al.
6,286,038 B1 9/2001 Reichmeyer et al.
6,288,716 B1 9/2001 Humpleman et al.
D451,529 S 12/2001 Vasquez
6,331,122 B1 12/2001 Wu
6,351,829 B1 2/2002 Dupont et al.
6,353,891 B1 3/2002 Borella et al.
6,363,417 B1 3/2002 Howard et al.
6,370,436 B1 4/2002 Howard et al.
6,377,861 B1 4/2002 York
6,385,772 B1 5/2002 Courtney
6,400,265 B1 6/2002 Saylor et al.
6,418,037 B1 7/2002 Zhang
D464,328 S 10/2002 Vasquez et al.
D464,948 S 10/2002 Vasquez et al.
6,462,507 B2 10/2002 Fisher, Jr.
6,462,663 B1 10/2002 Wilson et al.
6,467,084 B1 10/2002 Howard et al.
6,480,901 B1 11/2002 Weber et al.
6,493,020 B1 12/2002 Stevenson et al.
6,496,927 B1 12/2002 McGrane et al.
6,529,723 B1 3/2003 Bentley
6,542,075 B2 4/2003 Barker et al.
6,563,800 B1 5/2003 Salo et al.
6,574,234 B1 6/2003 Myer et al.
6,580,950 B1 6/2003 Johnson et al.
6,587,736 B2 7/2003 Howard et al.
6,591,094 B1 7/2003 Bentley
6,601,086 B1 7/2003 Howard et al.
6,609,127 B1 8/2003 Lee et al.
6,615,088 B1 9/2003 Myer et al.
6,621,827 B1 9/2003 Rezvani et al.
6,643,652 B2 11/2003 Helgeson et al.
6,643,669 B1 11/2003 Novak et al.
6,648,682 B1 11/2003 Wu
6,658,091 B1 12/2003 Naidoo et al.
6,661,340 B1 12/2003 Saylor et al.
6,686,838 B1 2/2004 Rezvani et al.
6,690,411 B2 2/2004 Naidoo et al.
6,693,545 B2 2/2004 Brown et al.
6,721,689 B2 4/2004 Markle et al.
6,721,747 B2 4/2004 Lipkin
6,738,824 B1 5/2004 Blair
6,756,998 B1 6/2004 Bilger
6,778,085 B2 8/2004 Faulkner et al.
6,781,509 B1 8/2004 Oppedahl et al.
6,789,147 B1 9/2004 Kessler et al.
6,795,322 B2 9/2004 Aihara et al.
6,798,344 B2 9/2004 Faulkner et al.
6,826,233 B1 11/2004 Oosawa
6,865,690 B2 3/2005 Kocin
6,891,838 B1 5/2005 Petite et al.
6,912,429 B1 6/2005 Bilger
6,928,148 B2 8/2005 Simon et al.
6,930,599 B2 8/2005 Naidoo et al.
6,930,730 B2 8/2005 Maxson et al.
6,931,445 B2 8/2005 Davis
6,943,681 B2 9/2005 Rezvani et al.
6,959,393 B2 10/2005 Hollis et al.
6,965,313 B1 11/2005 Saylor et al.
6,970,183 B1 11/2005 Monroe
6,972,676 B1 12/2005 Kimmel et al.
6,975,220 B1 12/2005 Foodman et al.
6,990,591 B1 1/2006 Pearson
7,016,970 B2 3/2006 Harumoto et al.
7,024,676 B1 4/2006 Klopfenstein
7,030,752 B2 4/2006 Tyroler
7,032,002 B1 4/2006 Rezvani et al.
7,034,681 B2 4/2006 Yamamoto et al.
7,039,391 B2 5/2006 Rezvani et al.
7,047,088 B2 5/2006 Nakamura et al.
7,047,092 B2 5/2006 Wimsatt
7,072,934 B2 7/2006 Helgeson et al.
7,079,020 B2 7/2006 Stilp
7,080,046 B1 7/2006 Rezvani et al.
7,085,937 B1 8/2006 Rezvani et al.
7,099,994 B2 8/2006 Thayer et al.
7,103,152 B2 9/2006 Naidoo et al.
7,106,176 B2 9/2006 La et al.
7,113,090 B1 9/2006 Saylor et al.
7,113,099 B2 9/2006 Tyroler et al.
7,120,232 B2 10/2006 Naidoo et al.
7,120,233 B2 10/2006 Naidoo et al.
7,130,383 B2 10/2006 Naidoo et al.
7,130,585 B1 10/2006 Ollis et al.
7,148,810 B2 12/2006 Bhat
7,149,798 B2 12/2006 Rezvani et al.
7,164,907 B2 1/2007 Cochran et al.
7,174,564 B1 2/2007 Weatherspoon et al.
7,183,907 B2 2/2007 Simon et al.
7,203,486 B2 4/2007 Patel
7,218,217 B2 5/2007 Adonailo et al.
7,222,359 B2 5/2007 Freund et al.
7,237,267 B2 6/2007 Rayes et al.
7,250,854 B2 7/2007 Rezvani et al.
7,254,779 B1 8/2007 Rezvani et al.
7,262,690 B2 8/2007 Heaton et al.
7,305,461 B2 12/2007 Ullman
7,337,217 B2 2/2008 Wang
7,337,473 B2 2/2008 Chang et al.
7,343,619 B2 3/2008 Ofek et al.
7,349,761 B1 3/2008 Cruse
7,349,967 B2 3/2008 Wang
7,367,045 B2 4/2008 Ofek et al.
7,370,115 B2 5/2008 Bae et al.
7,383,339 B1 6/2008 Meenan et al.
7,403,838 B2 7/2008 Deen et al.
7,409,451 B1 8/2008 Meenan et al.
7,428,585 B1 9/2008 Owens et al.
7,430,614 B2 9/2008 Shen et al.
7,440,434 B2 10/2008 Chaskar et al.
7,457,869 B2 11/2008 Kernan
7,469,139 B2 12/2008 Van De Groenendaal
7,469,294 B1 12/2008 Luo et al.
7,480,713 B2 1/2009 Ullman
7,480,724 B2 1/2009 Zimler et al.
7,498,695 B2 3/2009 Gaudreau et al.
7,506,052 B2 3/2009 Qian et al.

(56) References Cited

U.S. PATENT DOCUMENTS

| | | | |
|---|---|---|---|
| 7,509,687 | B2 | 3/2009 | Ofek et al. |
| 7,526,762 | B1 | 4/2009 | Astala et al. |
| 7,551,071 | B2 | 6/2009 | Bennett et al. |
| 7,558,379 | B2 | 7/2009 | Winick |
| 7,577,420 | B2 | 8/2009 | Srinivasan et al. |
| 7,587,464 | B2 | 9/2009 | Moorer et al. |
| 7,627,665 | B2 | 12/2009 | Barker et al. |
| 7,634,519 | B2 | 12/2009 | Creamer et al. |
| 9,144,143 | B2 | 9/2015 | Raji et al. |
| 2001/0016501 | A1 | 8/2001 | King |
| 2001/0034754 | A1 | 10/2001 | Elwahab et al. |
| 2002/0004828 | A1 | 1/2002 | Davis et al. |
| 2002/0026476 | A1 | 2/2002 | Miyazaki et al. |
| 2002/0029276 | A1 | 3/2002 | Bendinelli et al. |
| 2002/0038380 | A1 | 3/2002 | Brawn et al. |
| 2002/0052913 | A1 | 5/2002 | Yamada et al. |
| 2002/0083342 | A1 | 6/2002 | Webb et al. |
| 2002/0095490 | A1 | 7/2002 | Barker et al. |
| 2002/0103898 | A1 | 8/2002 | Moyer et al. |
| 2002/0103927 | A1 | 8/2002 | Parent |
| 2002/0107910 | A1 | 8/2002 | Zhao |
| 2002/0111698 | A1 | 8/2002 | Graziano et al. |
| 2002/0112051 | A1 | 8/2002 | Ullman |
| 2002/0112182 | A1 | 8/2002 | Chang et al. |
| 2002/0143923 | A1 | 10/2002 | Alexander |
| 2002/0156564 | A1 | 10/2002 | Preston et al. |
| 2002/0180579 | A1 | 12/2002 | Nagaoka et al. |
| 2002/0184301 | A1 | 12/2002 | Parent |
| 2003/0009552 | A1 | 1/2003 | Benfield et al. |
| 2003/0009553 | A1 | 1/2003 | Benfield et al. |
| 2003/0041167 | A1 | 2/2003 | French et al. |
| 2003/0051009 | A1 | 3/2003 | Shah et al. |
| 2003/0052923 | A1 | 3/2003 | Porter |
| 2003/0062997 | A1 | 4/2003 | Naidoo et al. |
| 2003/0090473 | A1 | 5/2003 | Joshi |
| 2003/0115345 | A1 | 6/2003 | Chien et al. |
| 2003/0132018 | A1 | 7/2003 | Okita et al. |
| 2003/0174648 | A1 | 9/2003 | Wang et al. |
| 2003/0187920 | A1 | 10/2003 | Redkar |
| 2003/0210126 | A1 | 11/2003 | Kanazawa |
| 2003/0230934 | A1 | 12/2003 | Cordelli et al. |
| 2003/0236841 | A1 | 12/2003 | Epshteyn |
| 2004/0003241 | A1 | 1/2004 | Sengodan et al. |
| 2004/0015572 | A1 | 1/2004 | Kang |
| 2004/0037295 | A1 | 2/2004 | Tanaka et al. |
| 2004/0054789 | A1 | 3/2004 | Breh et al. |
| 2004/0086088 | A1 | 5/2004 | Naidoo et al. |
| 2004/0123149 | A1 | 6/2004 | Tyroler |
| 2004/0139227 | A1 | 7/2004 | Takeda |
| 2004/0162902 | A1 | 8/2004 | Davis |
| 2004/0177163 | A1 | 9/2004 | Casey et al. |
| 2004/0243835 | A1 | 12/2004 | Terzis et al. |
| 2004/0267937 | A1 | 12/2004 | Klemets |
| 2005/0015805 | A1 | 1/2005 | Iwamura |
| 2005/0038326 | A1 | 2/2005 | Mathur |
| 2005/0066045 | A1 | 3/2005 | Johnson et al. |
| 2005/0069098 | A1 | 3/2005 | Kalervo et al. |
| 2005/0079855 | A1 | 4/2005 | Jethi et al. |
| 2005/0086126 | A1 | 4/2005 | Patterson |
| 2005/0108091 | A1 | 5/2005 | Sotak et al. |
| 2005/0108369 | A1 | 5/2005 | Sather et al. |
| 2005/0125083 | A1 | 6/2005 | Kiko |
| 2005/0128083 | A1 | 6/2005 | Puzio et al. |
| 2005/0149639 | A1 | 7/2005 | Vrielink et al. |
| 2005/0169288 | A1 | 8/2005 | Kamiwada et al. |
| 2005/0197847 | A1 | 9/2005 | Smith |
| 2005/0216302 | A1 | 9/2005 | Raji et al. |
| 2005/0216580 | A1 | 9/2005 | Raji et al. |
| 2005/0222820 | A1 | 10/2005 | Chung |
| 2005/0231349 | A1 | 10/2005 | Bhat |
| 2005/0280964 | A1 | 12/2005 | Richmond et al. |
| 2006/0009863 | A1 | 1/2006 | Lingemann |
| 2006/0088092 | A1 | 4/2006 | Chen et al. |
| 2006/0105713 | A1 | 5/2006 | Zheng et al. |
| 2006/0111095 | A1 | 5/2006 | Weigand |
| 2006/0181406 | A1 | 8/2006 | Petite et al. |
| 2006/0182100 | A1 | 8/2006 | Li et al. |
| 2006/0187900 | A1 | 8/2006 | Akbar |
| 2006/0200845 | A1 | 9/2006 | Foster et al. |
| 2006/0206220 | A1 | 9/2006 | Amundson |
| 2006/0209857 | A1 | 9/2006 | Hicks, III |
| 2006/0222153 | A1 | 10/2006 | Tarkoff et al. |
| 2006/0271695 | A1 | 11/2006 | Lavian |
| 2006/0282886 | A1 | 12/2006 | Gaug |
| 2007/0052675 | A1 | 3/2007 | Chang |
| 2007/0061266 | A1 | 3/2007 | Moore et al. |
| 2007/0106124 | A1 | 5/2007 | Kuriyama et al. |
| 2007/0142022 | A1 | 6/2007 | Madonna et al. |
| 2007/0256105 | A1 | 11/2007 | Tabe |
| 2007/0286210 | A1 | 12/2007 | Gutt et al. |
| 2007/0286369 | A1 | 12/2007 | Gutt et al. |
| 2007/0287405 | A1 | 12/2007 | Radtke |
| 2007/0298772 | A1 | 12/2007 | Owens et al. |
| 2008/0042826 | A1 | 2/2008 | Hevia et al. |
| 2008/0065681 | A1 | 3/2008 | Fontijn et al. |
| 2008/0084296 | A1 | 4/2008 | Kutzik et al. |
| 2008/0147834 | A1 | 6/2008 | Quinn et al. |
| 2008/0180240 | A1 | 7/2008 | Raji et al. |
| 2008/0183842 | A1 | 7/2008 | Raji et al. |
| 2008/0235326 | A1 | 9/2008 | Parsi et al. |
| 2009/0070436 | A1 | 3/2009 | Dawes et al. |
| 2009/0165114 | A1 | 6/2009 | Baum et al. |
| 2009/0177906 | A1 | 7/2009 | Paniagua et al. |
| 2009/0204693 | A1 | 8/2009 | Andreev et al. |
| 2009/0240787 | A1 | 9/2009 | Denny |
| 2009/0240814 | A1 | 9/2009 | Brubacher et al. |
| 2010/0052612 | A1 | 3/2010 | Raji et al. |
| 2010/0082744 | A1 | 4/2010 | Raji et al. |
| 2010/0095111 | A1 | 4/2010 | Gutt et al. |
| 2010/0095369 | A1 | 4/2010 | Gutt et al. |
| 2010/0332164 | A1 | 12/2010 | Aisa et al. |
| 2016/0233684 | A1 | 8/2016 | Raji |

FOREIGN PATENT DOCUMENTS

| | | | |
|---|---|---|---|
| JP | 2004-192659 | A | 7/2004 |
| KR | 10-2006-0021605 | A | 3/2006 |
| WO | 89/07855 | A1 | 8/1989 |
| WO | 01/52478 | A2 | 7/2001 |
| WO | 01/99078 | A2 | 12/2001 |
| WO | 2004/004222 | A1 | 1/2004 |
| WO | 2004/107710 | A1 | 12/2004 |
| WO | 2005/091218 | A3 | 7/2006 |
| WO | 2009/145747 | A1 | 12/2009 |
| WO | 2011/137458 | A1 | 11/2011 |

OTHER PUBLICATIONS

Form PCT/ISA/237, "PCT Written Opinion ofthe International Searching Authority of the Application No. PCT/US08/83254," dated Jan. 14, 2009, 7 pages.

Form PCT/ISA/237, "PCT Written Opinion of the International Searching Authority for the Application No. PCT/US10/50585," dated Dec. 30, 2010, 7 pages.

Form PCT/ISA/237, "PCT Written Opinion of the International Searching Authority for the Application No. PCT/US09/53485," dated Oct. 22, 2009, 8 pages.

Form PCT/ISA/237, "PCT Written Opinion ofthe International Searching Authority for the Application No. PCT/US05/08766," dated May 23, 2006, 5 pages.

Form PCT/ISA/220, PCT Notification of Transmittal of the International Search Report and the Written Opinion of the International Searching Authority, or the Declaration for the Application No. PCT/US05/08766, dated May 23, 2006, 1 page.

Form PCT/ISA/220, "PCT Notification of Transmittal of the International Search Report and the Written Opinion of the International Searching Authority, or the Declaration for the Application No. PCT/US08/74246" dated Nov. 14, 2008, 1 page.

Form PCT/ISA/220, "PCT Notification of Transmittal of the International Search Report and the Written Opinion fo the International

(56) References Cited

OTHER PUBLICATIONS

Searching Authority, or the Declaration for the Application No. PCT/US08/74260," dated Nov. 13, 2008, 1 page.
Form PCT/ISA/210, "PCT International Search Report for the Application No. PCT/US05/08766," dated May 23, 2006, 2 pages.
Examination Report under Section 18(3) re for UK Patent Application No. GB0800040.8, dated Jan. 30, 2008.
Examination Report under Section 18(3) re for UK Patent Application No. GB0724760.4, dated Jan. 30, 2008.
Examination Report under Section 18(3) re for UK Patent Application No. GB0724248.0, dated Jan. 30, 2008.
Examination Report under Section 18(3) re for UK Patent Application No. GB0724248.0, dated Jun. 4, 2008.
Examination Report under Section 18(3) re for UK Patent Application No. GB0620362.4, dated Aug. 13, 2007.
Alarm.com—Interactive Security Systems, Product Advantages [retrieved on Nov. 4, 2003], 3 pages.
Alarm.com—Interactive Security Systems, Overview [retrieved on Nov. 4, 2003], 2 pages.
Alarm.com—Interactive Security Systems, Frequently Asked Questions [retrieved on Nov. 4, 2003], 3 pages.
Alarm.com—Interactive Security Systems, Elders [retrieved on Nov. 4, 2003], 1 page.

INTELLIGENT POWER SUPPLY AND TRANSFORMATION FOR USER DEVICES

CROSS-REFERENCE TO RELATED APPLICATIONS

This application is a continuation of U.S. patent application Ser. No. 14/852,781, filed Sep. 14, 2015, which is a continuation of U.S. patent application Ser. No. 13/099,293, filed May 2, 2011, issued as U.S. Pat. No. 9,144,143 on Sep. 22, 2015, and is a non-provisional of and claims the benefit of U.S. Provisional Application No. 61/329,610, filed Apr. 30, 2010, which are hereby incorporated by reference in their entirety.

BACKGROUND

Typical low voltage outdoor devices are either battery-powered or require a 110/220 Volt alternating current (AC) wall outlet to enable an external or internal power supply to generate the necessary voltage(s) for the device. However, battery life is always limited with these devices and requires the user to change batteries on a periodic basis, creating a major inconvenience as well as potential risks (e.g. battery runs out and there is no one around to replace it, rendering the device useless the batteries are replaced). Furthermore, outside wall sockets for a typical home are usually very limited in number compared to indoor outlets, and this either prevents the installation of the device in the desired location or requires the use of long and/or unsightly extension cords. Outdoor extension cords also present a danger when used as a component of a permanent installation.

SUMMARY

Methods and systems for intelligent power supply and transformation for user devices are described. A power requirement of a user device may be determined, such as by a regulator device. The user device and the regulator device may be located at a premises and may be in communication. A transformer may be located at the premises and in communication with the regulator device. The transformer may comprise a plurality of output terminals. The output terminals may be associated with different voltages. Based on the power requirement of the user device, one of the output terminals may be determined, such as by the regulator device. A signal may be output from the determined output terminal to the user device.

A system may comprise a transformer and a regulator device in communication with the transformer. The system may be located at a premises. The transformer may comprise a plurality of output terminals. The output terminals may be associated with a different voltage. The regulator device may be configured to determine a power requirement of a user device. The user device may be located at the premises. The regulator device may be configured to communicate with the user device. Based on the power requirement of the user device, the regulator device may be configured to determine one of the output terminals of the transformer. The regulator device may be configured to cause output, to the user device and from the determined output terminal, of a signal.

A regulator device may comprise one or more processors. The regulator device may comprise memory, which may store instructions. The instructions, when executed by the one or more processors, may cause the regulator device to determine a power requirement of a user device. The regulator device and the user device may be located at a premises and may be in communication. A transformer may be located at the premises and in communication with the regulator device. The transformer may comprise a plurality of output terminals. The output terminals may be associated with different voltages. The instructions, when executed, may cause the regulator device to determine, based on the power requirement of the user device, one of the output terminals of the transformer. The instructions, when executed, may cause the regulator device to cause output, to the user device and from the determined output terminal, of a signal.

DETAILED DESCRIPTION

Embodiments described include a system comprising a voltage transformer connected to a power source. The voltage transformer transforms a high voltage of the power source to a first low voltage signal. Regulators are connected to the voltage transformer, and the regulators receive the first low voltage signal from the voltage transformer and convert the first low voltage signal to a second low voltage signal. A remote device is connected to each of the regulators. The remote device is powered by the second low voltage signal from the regulator to which it is connected. The remote devices include, for example, security system components and/or network components like those described in the Related Applications.

Embodiments herein also include a method comprising transforming a high voltage of a power source to a first low voltage signal. The first low voltage signal is distributed to nodes via a first wired connection. The first low voltage signal is converted to a second low voltage signal at each of the nodes. The method distributes the second low voltage signal of a node to a remote device connected to the node via a second wired connection. The second low voltage signal powers the remote device. The remote devices include, for example, security system components and/or network components like those described in the Related Applications.

Although the detailed description herein contains many specifics for the purposes of illustration, anyone of ordinary skill in the art will appreciate that many variations and alterations to the following details are within the scope of the embodiments described herein. Thus, the following illustrative embodiments are set forth without any loss of generality to, and without imposing limitations upon, the claimed invention.

Figure 1:
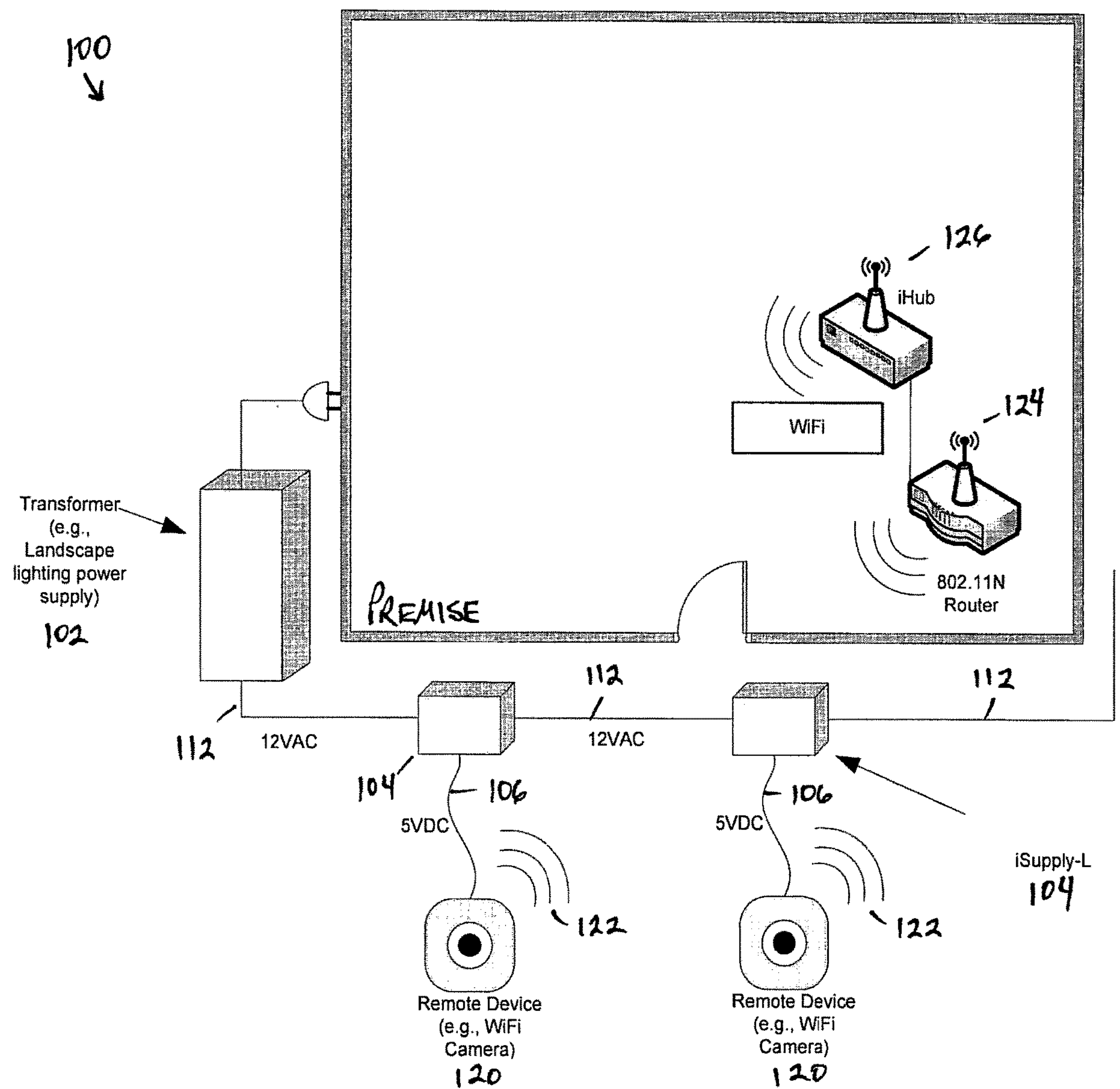
FIG. 1 is an example block diagram for a Remote Power Solution (RPS).

FIG. 1 is a block diagram for a Remote Power Solution (RPS) 100, under an embodiment. In this configuration the RPS 100 provides power to remote devices 120 using at least one transformer 102. The remote devices 120 of an embodiment include remote security components or devices that require power for operation. For example, the remote security components 120 include one or more of remote security cameras, also referred to as outdoor cameras, or other security sensors or devices as described in the Related Applications (e.g., Internet Protocol (IP) devices, sensors, input/output (I/O) devices, etc.).

The transformer 102 of an embodiment includes a low-voltage transformer, for example a low-voltage landscape lighting transformer that provides power to connected devices using a low-voltage cable 112. One or more remote devices 120 connect to the low-voltage cable 112 through a regulator unit, referred to as the iSupply-L 104. The transformer converts a high-voltage transformer input signal to a low-voltage output signal, and the iSupply-L regulator 104 of an embodiment converts the low-voltage output of the transformer 102 to a voltage appropriate for the remote device 120. The remote devices 120, once powered, operate as designed, and in the case of the cameras shown, communicate over a radio frequency (RF) protocol 122 (e.g., 802.11 (WiFi)) to a router 124 and/or home gateway 126.

The iSupply-L regulator 104 of an embodiment is coupled or connected to an output of the transformer 102. The iSupply-L regulator 104 converts the output of the transformer 102 to a voltage type and level appropriate to the power specification of the corresponding remote device 120. As an example, the iSupply-L regulator 104 converts the 12 Volts alternating current (AC) (VAC) output signal of the transformer 102 of an embodiment to a 5 Volt direct current (DC) (VDC) signal that couples or connects to the remote device 120 (e.g., WiFi camera). An embodiment includes one iSupply-L regulator 104 for each remote device 120. An alternative embodiment can use one iSupply-L regulator 104 to provide power for more than one remote device 120.

Figure 2:
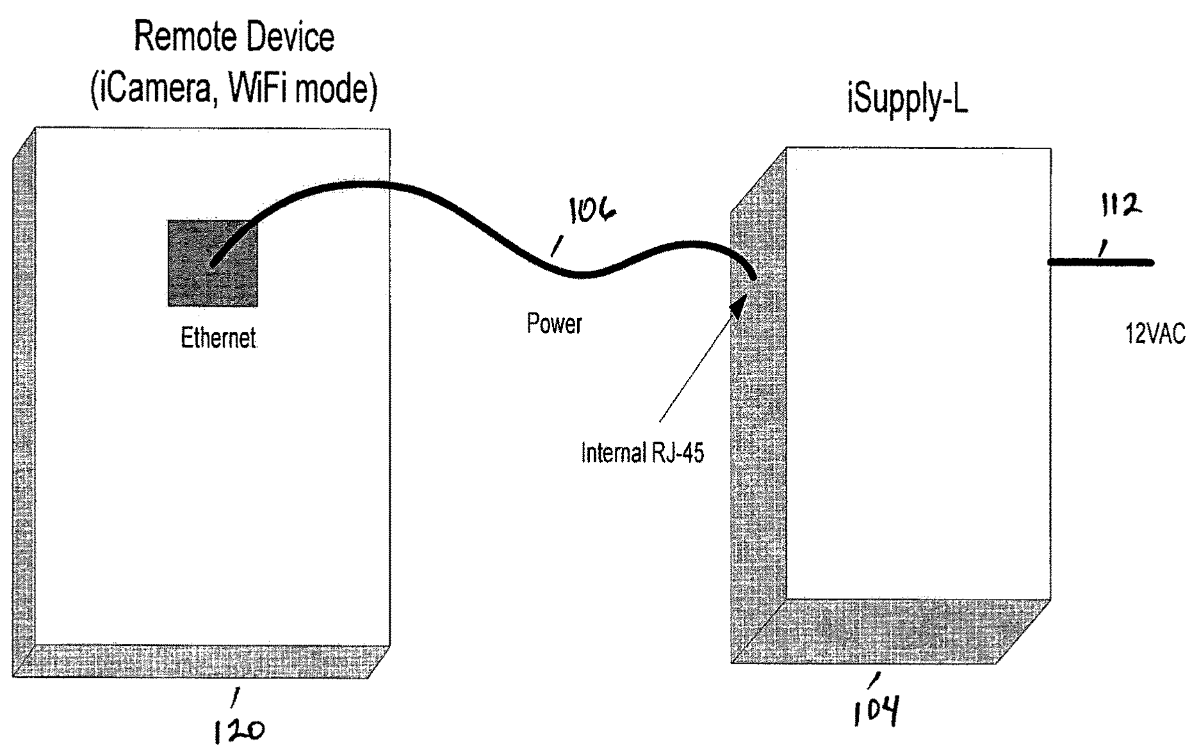
FIG. 2 shows an example connection of a remote device to the iSupply-L voltage regulator.

FIG. 2 shows the connection 106 of a remote device 120 to the iSupply-L regulator 104, under an embodiment. In this example, a Category 5 cable (Cat 5) 106 is used to connect the iSupply-L regulator 104 to the remote devices 120. The Cat 5 cable 106 comprises a twisted pair high signal integrity cable type used in structured cabling for computer networks. Alternative embodiments, however, are not limited to the use of Cat 5 cabling and can use any cable that matches the power requirements of the remote device (e.g. USB, 4-wire security cable, etc). The connection of the iSupply-L regulator 104 to the Cat 5 cable 106 is sealed to provide adequate waterproofing for the outdoor environment.

Using the low-voltage lighting transformer as an example, components of a conventional outdoor lighting system for illuminating outdoor landscaping supply power to the RPS of an embodiment. The outdoor lighting system typically comprises a light housing containing a light source connected to the end of an elongated support. A spike shaped stake is connected to the other end of the elongated support allowing the outdoor lighting to be staked into the ground around the landscaping that is desired to be illuminated. Outdoor lighting may be powered by conventional alternating current (AC) or direct current (DC) sources via a transformer having a low-voltage output to reduce the hazards of inadvertent electrical shock. The electrical current is provided by means of a two-conductor wiring cable (low-voltage cable) that is buried alongside each of the lighting units. One end of the wiring cable is connected to the low-voltage transformer, which may be operatively controlled by means of a timer or light-sensing device, to turn on the lights only during nighttime. The transformer is powered by conventional household current (e.g., 110 VAC). The remote devices of an embodiment can be positioned anywhere throughout the landscaping as desired and connected to the wiring cable by means of the iSupply-L regulator. Power to the remote devices is provided by leads connected to the iSupply-L regulator, and the iSupply-L regulators are connected in parallel to the wiring cable.

The transformers of an embodiment are electrical devices that utilize a primary and secondary winding to provide an output potential from the secondary winding that is lower than the potential of a power source coupled or connected to the primary winding. An example application of such transformers is in landscape lighting systems, which include low-voltage landscape lighting fixtures. In landscape lighting applications, the primary winding of a lighting transformer is coupled or connected to a 110 VAC power source and the secondary winding is connected to one or more runs of 12 VAC landscape lighting fixtures.

The landscape lighting transformer of an embodiment includes multiple taps that provide a range of output voltages for different wire runs that require different voltages (e.g., higher, or lower) to compensate for power losses through the wire runs as a result of excessive wire lengths or to accommodate different types of devices. In such cases, the transformer includes output terminals corresponding to a range of voltages such as, for example, from 5V to 18V. The secondary winding of the transformer includes one or more circuit-breakers or fuses that protect the transformer from overload or damage.

More specifically, the transformer of an embodiment includes a primary winding or coil, a core, and a secondary winding or coil. The core is formed of EI, ferrous, core metal laminates or can be toroidal. A toroidal transformer core is formed using a tape-wound strip of electrical steel. The primary and secondary windings are threaded through a central opening in the toroidal core and distributed evenly along the circumference of the core. A high voltage (e.g., 110 VAC) is applied to the primary winding, and the secondary winding is inductively coupled to the primary winding such that a lower voltage proportional to the number of windings is set up in the secondary winding. The transformer comprises one or more standard output taps coupled to the secondary winding for tapping a desired voltage, e.g., 5V, 6V, 12V, 14V, etc.

Additionally, the secondary winding of an embodiment includes a common tap corresponding to 300 W of power capacity for returning current back to the secondary winding. The common taps of the transformer of an embodiment are provided in multiples of 300 W of power capacity, but are not so limited. Thus, a 300 W transformer includes one standard common tap, a 600 W transformer includes two standard common taps, a 900 W transformer includes three standard common taps, a 1200 W transformer includes four standard common taps, and a 1500 W transformer includes five standard common taps, for example. Each 300 W common tap is protected by a circuit breaker, fuse, or any other type of device that can clear a short or overload.

Figure 3:
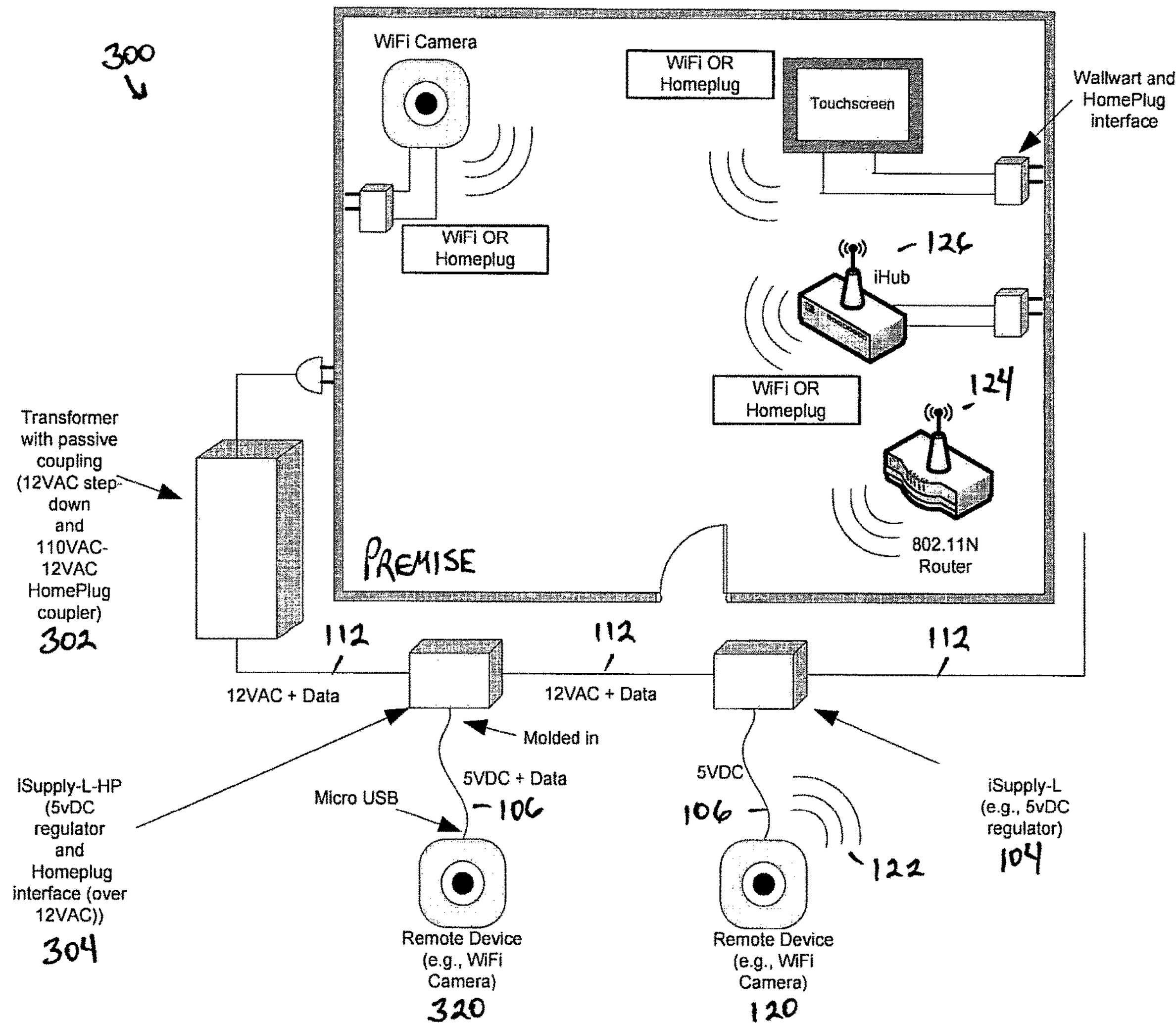
FIG. 3 is an example a block diagram for a Remote Power Solution (RPS) comprising an alternate data communication path for the powered device.

As described above, the remote devices operate to communicate over a radio frequency (RF) protocol (e.g., 802.11 (WiFi)) to a router or home gateway, or other remote components in the premise environment (e.g., indoor and/or outdoor environment). However, in some situations or installations, wireless routing of signals may not be possible. FIG. 3 is a block diagram for a Remote Power Solution (RPS) 300 comprising an alternate data communication path for the powered device, under an alternative embodiment. In this embodiment the RPS 300 supports an alternate communication path to the RF link for the remote devices should the devices require such data connectivity. In the case where the RPS 300 is also used for data/network connectivity for the low-voltage device, the additional communication path provides an alternative for when the RF communication link for the remote device (e.g., WiFi) is unreliable or unavailable.

In this embodiment, the transformer 302, referred to as the iTransformer 302, comprises a low-voltage transformer integrated with a passive coupling circuit for transferring powerline communication signals (in this case HomePlug AV) between the primary and secondary sides (e.g., 110 VAC (primary) and 12 VAC (secondary) sides) of the transformer. The transformer portion of the iTransformer 302 includes a low-voltage transformer, for example a low-voltage landscape lighting transformer that provides power to connected devices using a low-voltage cable 112. One or more remote devices 120/320 connect to the low-voltage cable 112 through a regulator unit 104/304. The transformer converts a high-voltage transformer input signal to a low-voltage output signal, and the regulator 104/304 of an embodiment converts the low-voltage output of the transformer to a voltage appropriate for the remote device 120/320. The remote devices 120/320, once powered, operate as designed, and in the case of the cameras shown, communicate over a radio frequency (RF) protocol 122 (e.g., 802.11 (WiFi)) and/or a wired link to a router 124 and/or home gateway 126.

When the remote device 120 is an RF device capable of communicating with remote components via an RF protocol, then the remote device 120 connects to the low-voltage cable 112 through the iSupply-L regulator 104. The iSupply-L regulator 104 of an embodiment is connected to an output of the iTransformer 302. The iSupply-L regulator 104 converts the output of the iTransformer 302 to a voltage type and level appropriate to the power specification of the corresponding remote device 120. As an example, the iSupply-L regulator 104 converts the 12 VAC output of the iTransformer 302 of an embodiment to a 5 VDC signal that couples or connects to the remote device 120 (e.g., WiFi camera). The remote devices 120, once powered, operate as designed, and in the case of the cameras shown, communicate over the RF protocol 122 (e.g., 802.11 (WiFi)) to a router 124 and/or home gateway 126.

When the remote device 320 is not capable of communicating with remote components via an RF protocol, then the remote device 320 connects to the low-voltage cable 112 through the iSupply-L-HP regulator 304. The iSupply-L-HP regulator 304, as an alternative embodiment of the iSupply-L regulator described above, provides communication components for transferring data from the remote device 320 to the iTransformer 302 in addition to the power regulation capability. Therefore, the iSupply-L-HP regulator 304 of an embodiment converts the 12 VAC of the low-voltage transformer 302 to a voltage appropriate for the remote device 320 and, additionally, transfers data between the low-voltage cable 112 that connects to the iTransformer 302 and the cable 112 (e.g., Cat 5) that connects the iSupply-L-HP regulator 304 to the remote device 320. Thus, data and other information are communicated to and from the remote device 320 via a wired link comprising the passive coupling circuit of the iTransformer 302, the wired connection 112 between the iTransformer 302 and the iSupply-L-HP regulator 304, and the wired connection 106 between the iSupply-L-HP regulator 304 and the corresponding remote device 320. As described above, the wired link of an embodiment comprises the low-voltage cable 112 connecting the iTransformer 302 and the iSupply-L-HP regulator 304, and the cable 106 (e.g., Cat 5) connecting the iSupply-L-HP regulator 304 to the corresponding remote device 320. Therefore, when RF communication is not possible (e.g., due to interference, signal degradation, etc.) the wired link 112/106 provides a data communication path between the remote device 320 and other components or devices 124/126 of the premise environment (e.g., indoor and/or outdoor environment). Any number and/or combination of iSupply-L 104 and iSupply-L-HP 304 regulators can be used in combination with the iTransformer 302 of an embodiment.

Figure 4:
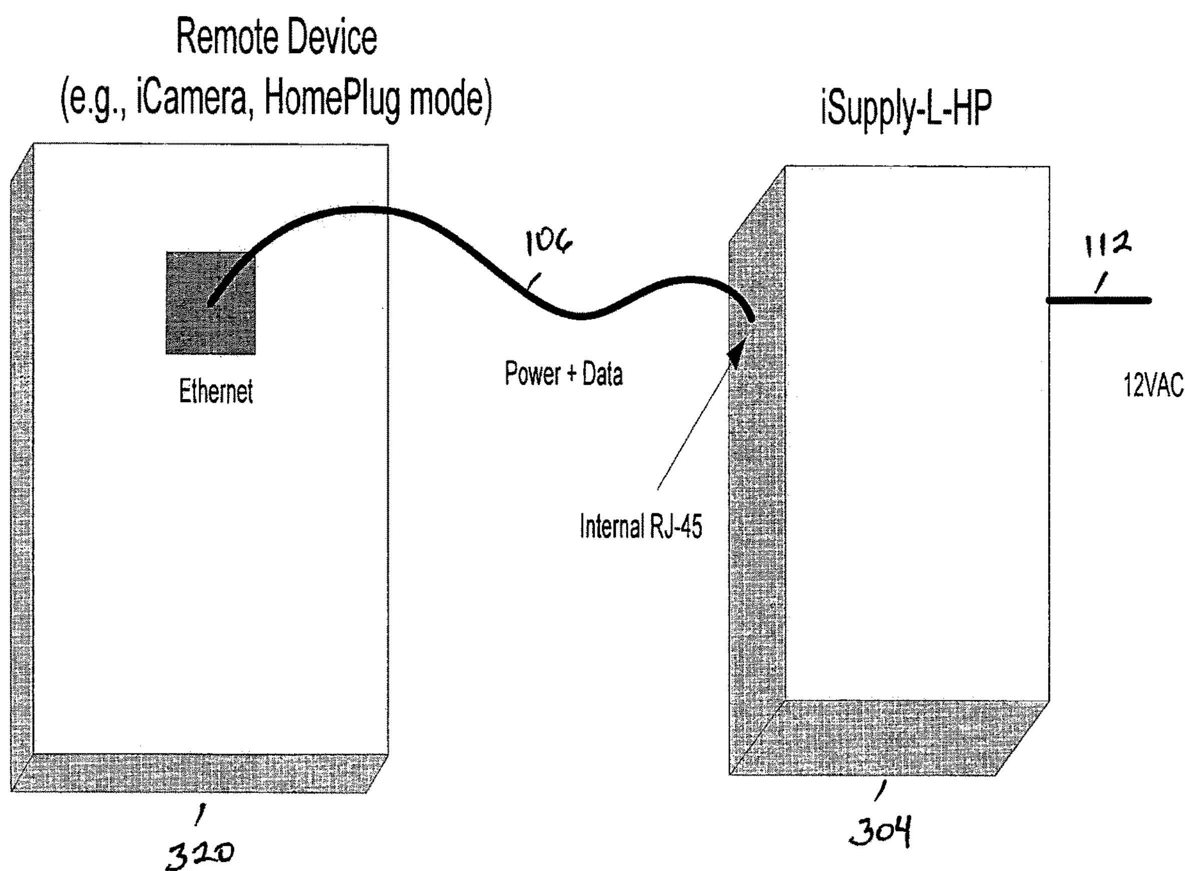
FIG. 4 shows an example connection of a remote device to the iSupply-L-HP voltage regulator.

FIG. 4 shows the connection 106 of a remote device 320 to the iSupply-L-HP regulator 304, under an embodiment. In this example, a Category 5 cable (Cat 5) 106 is used to connect the iSupply-L-HP regulator 304 to the remote devices 320 to provide power to the remote device as well as to provide a data path over which the remote device 320 and other components or devices 124/126 of the premise environment (e.g., indoor and/or outdoor environment) communicate. The Cat 5 cable 106 comprises a twisted pair high signal integrity cable type used in structured cabling for computer networks. Alternative embodiments, however, are not limited to the use of Cat 5 cabling and can use any cable that matches the power requirements of the remote device (e.g. USB, 4-wire security cable, etc). The connection of the iSupply-L-HP regulator 304 to the Cat 5 cable 106 is sealed to provide adequate waterproofing for the outdoor environment.

Embodiments described herein include a system comprising a voltage transformer connected to a power source. The voltage transformer transforms a high voltage of the power source to a first low voltage signal. The system comprises a plurality of regulators connected to the voltage transformer. The plurality of regulators receives the first low voltage signal from the voltage transformer and converts the first low voltage signal to a second low voltage signal. The system comprises a remote device connected to each of the plurality of regulators. The remote device is powered by the second low voltage signal from the regulator to which it is connected.

Embodiments described herein include a system comprising: a voltage transformer connected to a power source, wherein the voltage transformer transforms a high voltage of the power source to a first low voltage signal; a plurality of regulators connected to the voltage transformer, wherein the plurality of regulators receives the first low voltage signal from the voltage transformer and converts the first low voltage signal to a second low voltage signal; and a remote device connected to each of the plurality of regulators, wherein the remote device is powered by the second low voltage signal from the regulator to which it is connected.

The remote device of an embodiment is a security system component of a security system comprising a plurality of security system components located at a premise, wherein the remote device communicates with the plurality of security system components.

The remote device of an embodiment communicates with the plurality of security system components via a radio frequency link.

The voltage transformer of an embodiment comprises a passive coupling circuit for transferring power-line communication signals.

The remote device of an embodiment communicates with the plurality of security system components via a wired link comprising the passive coupling circuit and the connection between the remote device, the corresponding regulator, and the voltage transformer.

The remote device of an embodiment communicates with the plurality of security system components via a radio frequency link.

The remote device of an embodiment communicates with the plurality of security system components via at least one of a radio frequency link and a wired link comprising the passive coupling circuit and the connection between the remote device, the corresponding regulator, and the voltage transformer.

The remote device of an embodiment is an Internet Protocol (IP) device.

The remote device of an embodiment is a camera.

The remote device of an embodiment is a sensor.

The remote device of an embodiment is an input/output (I/O) device.

The remote device of an embodiment is connected to the regulator using a Category 5 cable.

The high voltage of an embodiment is approximately 110 volts alternating current.

The first low voltage signal of an embodiment is approximately 12 volts alternating current.

The second low voltage signal of an embodiment is approximately 5 volts direct current.

Embodiments described herein include a system comprising a plurality of regulators. Each regulator of the plurality of regulators is connected to a voltage transformer via a low-voltage cable and receives a first low voltage signal from the voltage transformer and converts the first low voltage signal to a second low voltage signal. The system comprises a remote device connected to each of the plurality of regulators. The remote device is powered by the second low voltage signal from the regulator to which it is connected.

Embodiments described herein include a system comprising: a plurality of regulators, wherein each regulator of the plurality of regulators is connected to a voltage transformer via a low-voltage cable and receives a first low voltage signal from the voltage transformer and converts the first low voltage signal to a second low voltage signal; and a remote device connected to each of the plurality of regulators, wherein the remote device is powered by the second low voltage signal from the regulator to which it is connected.

The remote device of an embodiment is a security system component of a security system comprising a plurality of security system components located at a premise, wherein the remote device communicates with the plurality of security system components.

The remote device of an embodiment communicates with the plurality of security system components via a radio frequency link.

The voltage transformer of an embodiment is connected to a power source, wherein the voltage transformer transforms a high voltage of the power source to the first low voltage signal.

The high voltage of an embodiment is approximately 110 volts alternating current.

The first low voltage signal of an embodiment is approximately 12 volts alternating current.

The second low voltage signal of an embodiment is approximately 5 volts direct current.

The voltage transformer of an embodiment comprises a passive coupling circuit for transferring power-line communication signals.

The remote device of an embodiment communicates with the plurality of security system components via a wired link comprising the passive coupling circuit and the connection between the remote device, the corresponding regulator, and the voltage transformer.

The remote device of an embodiment communicates with the plurality of security system components via a radio frequency link.

The remote device of an embodiment communicates with the plurality of security system components via at least one of a radio frequency link and a wired link comprising the passive coupling circuit and the connection between the remote device, the corresponding regulator, and the voltage transformer.

The remote device of an embodiment is an Internet Protocol (IP) device.

The remote device of an embodiment is a camera.

The remote device of an embodiment is a sensor.

The remote device of an embodiment is an input/output (I/O) device.

The remote device of an embodiment is connected to the regulator using a Category 5 cable.

Embodiments described herein include a system comprising a device comprising a voltage transformer and a passive coupling circuit. The voltage transformer is connected to a power source and transforms a high voltage of the power source to a first low voltage signal. The passive coupling circuit transfers power-line communication signals. The system comprises a plurality of regulators connected to the device. Each regulator of the plurality of regulators receives the first low voltage signal from the device and converts the first low voltage signal to a second low voltage signal. The system comprises a remote device connected to each of the plurality of regulators. The remote device is powered by the second low voltage signal from the regulator to which it is connected. The remote device exchanges data with a plurality of remote components via a wired link comprising the regulator and the passive coupling circuit.

Embodiments described herein include a system comprising: a device comprising a voltage transformer and a passive coupling circuit, wherein the voltage transformer is connected to a power source and transforms a high voltage of the power source to a first low voltage signal, wherein the passive coupling circuit transfers power-line communication signals; a plurality of regulators connected to the device, wherein each regulator of the plurality of regulators receives the first low voltage signal from the device and converts the first low voltage signal to a second low voltage signal; and a remote device connected to each of the plurality of regulators, wherein the remote device is powered by the second low voltage signal from the regulator to which it is connected, wherein the remote device exchanges data with a plurality of remote components via a wired link comprising the regulator and the passive coupling circuit.

The remote device of an embodiment is a security system component of a security system comprising a plurality of security system components located at a premise, wherein the remote device communicates with the plurality of security system components.

The remote device of an embodiment communicates with the plurality of security system components via a radio frequency link.

The remote device of an embodiment communicates with the plurality of security system components via a wired link comprising the passive coupling circuit and the connection between the remote device, the corresponding regulator, and the voltage transformer.

The remote device of an embodiment communicates with the plurality of security system components via at least one of a radio frequency link and a wired link comprising the passive coupling circuit and the connection between the remote device, the corresponding regulator, and the voltage transformer.

The remote device of an embodiment is an Internet Protocol (IP) device.

The remote device of an embodiment is a camera.

The remote device of an embodiment is a sensor.

The remote device of an embodiment is an input/output (I/O) device.

The remote device of an embodiment is connected to the regulator using a Category 5 cable.

The high voltage of an embodiment is approximately 110 volts alternating current.

The first low voltage signal of an embodiment is approximately 12 volts alternating current.

The second low voltage signal of an embodiment is approximately 5 volts direct current.

Embodiments described herein include a method comprising transforming a high voltage of a power source to a first low voltage signal. The method comprises distributing the first low voltage signal to a plurality of nodes via a first wired connection. The method comprises converting the first low voltage signal to a second low voltage signal at each node of the plurality of nodes. The method comprises distributing the second low voltage signal of a node to a remote device connected to the node via a second wired connection, wherein the second low voltage signal powers the remote device.

Embodiments described herein include a method comprising: transforming a high voltage of a power source to a first low voltage signal; distributing the first low voltage signal to a plurality of nodes via a first wired connection; converting the first low voltage signal to a second low voltage signal at each node of the plurality of nodes; and distributing the second low voltage signal of a node to a remote device connected to the node via a second wired connection, wherein the second low voltage signal powers the remote device.

The remote device of an embodiment is a security system component of a security system comprising a plurality of security system components located at a premise, wherein the remote device communicates with the plurality of security system components.

The method of an embodiment comprises the remote device communicating with the plurality of security system components via a radio frequency link.

The method of an embodiment comprises transferring power-line communication signals from the remote device using a passive coupling circuit.

The method of an embodiment comprises the remote device communicating with the plurality of security system components via a wired link comprising the passive coupling circuit, the first wired connection and the second wired connection.

The method of an embodiment comprises the remote device communicating with the plurality of security system components via a radio frequency link.

The method of an embodiment comprises the remote device communicating with the plurality of security system components via at least one of a radio frequency link and a wired link comprising the passive coupling circuit, the first wired connection and the second wired connection.

The remote device is an Internet Protocol (IP) device.

The remote device is a camera.

The remote device is a sensor.

The remote device is an input/output (I/O) device.

The first wired connection is a low-voltage cable and the second wired connection is a Category 5 cable.

The high voltage is approximately 110 volts alternating current.

The first low voltage signal is approximately 12 volts alternating current.

The second low voltage signal is approximately 5 volts direct current.

Embodiments described herein include a method comprising receiving a first low voltage signal. The method comprises distributing the first low voltage signal to a plurality of nodes via a first wired connection. The method comprises converting the first low voltage signal to a second low voltage signal at each node of the plurality of nodes. The method comprises distributing the second low voltage signal of a node to a remote device connected to the node via a second wired connection. The second low voltage signal powers the remote device.

Embodiments described herein include a method comprising: receiving a first low voltage signal; distributing the first low voltage signal to a plurality of nodes via a first wired connection; converting the first low voltage signal to a second low voltage signal at each node of the plurality of nodes; and distributing the second low voltage signal of a node to a remote device connected to the node via a second wired connection, wherein the second low voltage signal powers the remote device.

The method of an embodiment comprises transforming a high voltage of a power source to generate the first low voltage signal.

The high voltage of an embodiment is approximately 110 volts alternating current.

The first low voltage signal of an embodiment is approximately 12 volts alternating current.

The second low voltage signal of an embodiment is approximately 5 volts direct current.

The remote device of an embodiment is a security system component of a security system comprising a plurality of security system components located at a premise, wherein the remote device communicates with the plurality of security system components.

The method of an embodiment comprises the remote device communicating with the plurality of security system components via a radio frequency link.

The method of an embodiment comprises transferring power-line communication signals from the remote device using a passive coupling circuit.

The method of an embodiment comprises the remote device communicating with the plurality of security system components via a wired link comprising the passive coupling circuit, the first wired connection and the second wired connection.

The method of an embodiment comprises the remote device communicating with the plurality of security system components via a radio frequency link.

The method of an embodiment comprises the remote device communicating with the plurality of security system components via at least one of a radio frequency link and a wired link comprising the passive coupling circuit, the first wired connection and the second wired connection.

The remote device of an embodiment is an Internet Protocol (IP) device.

The remote device of an embodiment is a camera.

The remote device of an embodiment is a sensor.

The remote device of an embodiment is an input/output (I/O) device.

The first wired connection of an embodiment is a low-voltage cable and the second wired connection is a Category 5 cable.

Embodiments described herein include a method comprising transforming a high voltage of a power source to a first low voltage signal. The method comprises distributing the first low voltage signal to a plurality of nodes via a first wired connection. The method comprises converting the first low voltage signal to a second low voltage signal at each node of the plurality of nodes. The method comprises distributing the second low voltage signal of a node to a remote device connected to the node via a second wired connection. The second low voltage signal powers the remote device. The method comprises communicating data between the remote device and a plurality of remote components via a passive coupling circuit and the plurality of nodes.

Embodiments described herein include a method comprising: transforming a high voltage of a power source to a first low voltage signal; distributing the first low voltage signal to a plurality of nodes via a first wired connection; converting the first low voltage signal to a second low voltage signal at each node of the plurality of nodes; distributing the second low voltage signal of a node to a remote device connected to the node via a second wired connection, wherein the second low voltage signal powers the remote device; and communicating data between the remote device and a plurality of remote components via a passive coupling circuit and the plurality of nodes.

The method of an embodiment comprises transforming a high voltage of a power source to generate the first low voltage signal.

The high voltage of an embodiment is approximately 110 volts alternating current.

The first low voltage signal of an embodiment is approximately 12 volts alternating current.

The second low voltage signal of an embodiment is approximately 5 volts direct current.

The remote device of an embodiment is a security system component of a security system comprising a plurality of security system components located at a premise, wherein the remote device communicates with the plurality of security system components.

The method of an embodiment comprises the remote device communicating with the plurality of security system components via a radio frequency link.

The method of an embodiment comprises the remote device communicating with the plurality of security system components via a wired link comprising the passive coupling circuit, the first wired connection and the second wired connection.

The method of an embodiment comprises the remote device communicating with the plurality of security system components via at least one of a radio frequency link and a wired link comprising the passive coupling circuit, the first wired connection and the second wired connection.

The remote device of an embodiment is an Internet Protocol (IP) device.

The remote device of an embodiment is a camera.

The remote device of an embodiment is a sensor.

The remote device of an embodiment is an input/output (I/O) device.

The first wired connection of an embodiment is a low-voltage cable and the second wired connection is a Category 5 cable.

The systems and methods described herein include and/or run under and/or in association with a processing system. The processing system includes any collection of processor-based devices or computing devices operating together, or components of processing systems or devices, as is known in the art. For example, the processing system can include one or more of a portable computer, portable communication device operating in a communication network, and/or a network server. The portable computer can be any of a number and/or combination of devices selected from among personal computers, cellular telephones, personal digital assistants, portable computing devices, and portable communication devices, but is not so limited. The processing system can include components within a larger computer system.

The processing system of an embodiment includes at least one processor and at least one memory device or subsystem. The processing system can also include or be coupled to at least one database. The term "processor" as generally used herein refers to any logic processing unit, such as one or more central processing units (CPUs), digital signal processors (DSPs), application-specific integrated circuits (ASIC), etc. The processor and memory can be monolithically integrated onto a single chip, distributed among a number of chips or components of a host system, and/or provided by some combination of algorithms. The methods described herein can be implemented in one or more of software algorithm(s), programs, firmware, hardware, components, circuitry, in any combination.

System components embodying the systems and methods described herein can be located together or in separate locations. Consequently, system components embodying the systems and methods described herein can be components of a single system, multiple systems, and/or geographically separate systems. These components can also be subcomponents or subsystems of a single system, multiple systems, and/or geographically separate systems. These components can be coupled to one or more other components of a host system or a system coupled to the host system.

Communication paths couple the system components and include any medium for communicating or transferring files among the components. The communication paths include wireless connections, wired connections, and hybrid wireless/wired connections. The communication paths also include couplings or connections to networks including local area networks (LANs), metropolitan area networks (MANs), wide area networks (WANs), proprietary networks, interoffice or backend networks, and the Internet. Furthermore, the communication paths include removable fixed mediums like floppy disks, hard disk drives, and CD-ROM disks, as well as flash RAM, Universal Serial Bus (USB) connections, RS-232 connections, telephone lines, buses, and electronic mail messages.

Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of embodiments is not intended to be exhaustive or to limit the systems and methods described to the precise form disclosed. While specific embodiments and examples are described herein for illustrative purposes, various equivalent modifications are possible within the scope of other systems and methods, as those skilled in the relevant art will recognize. The teachings provided herein can be applied to other systems and methods, not only for the systems and methods described above.

The elements and acts of the various embodiments described above can be combined to provide further embodiments. These and other changes can be made to the embodiments in light of the above detailed description.

What is claimed:

1. A method comprising:

determining a power requirement of a user device;

determining, based at least on the power requirement of the user device, one of a plurality of output terminals of a transformer, wherein each of the output terminals of the transformer is associated with a different voltage; and causing output, to the user device and via the determined one of the plurality of output terminals, of a signal.

2. The method of claim 1, wherein the determining the one of the plurality of output terminals is based on a distance between the user device and the transformer.

3. The method of claim 1, wherein the determining the one of the plurality of output terminals is based on a length of a coupling between the user device and the transformer.

4. The method of claim 1, wherein the determining the power requirement of the user device comprises receiving an indication of the power requirement of the user device.

5. The method of claim 1, wherein the method further comprises receiving, from the one of the plurality of output terminals, a first signal having a voltage associated with the determined one of the plurality of output terminals; and wherein the causing output of the signal comprises outputting, to the user device and based on the power requirement of the user device, a second signal having a voltage different than the voltage associated with the determined one of the plurality of output terminals.

6. A system comprising:

a transformer comprising a plurality of output terminals, wherein each of the plurality of output terminals is associated with a different voltage; and a computing device in communication with the transformer, wherein the computing device is configured to:

determine a power requirement of a user device;

determine, based at least on the power requirement of the user device, one of the plurality of output terminals of the transformer; and cause output, to the user device and via the determined one of the plurality of output terminals, of a signal.

7. The system of claim 6, wherein the user device comprises at least one of a security system device, a home automation device, a lighting device, a camera device, or a sensor device.

8. The system of claim 6, wherein the determining the power requirement of the user device comprises receiving, from the user device, an indication of the power requirement of the user device.

9. The system of claim 6, wherein the computing device is further configured to:

receive data for the user device; and send, to the user device, the data.

10. The system of 9, wherein the receiving the data for the user device comprises receiving, via a first communication protocol, the data; and wherein the sending, to the user device, the data comprises sending, to the user device and via a second communication protocol, the data, wherein the second communication protocol is different than the first communication protocol.

11. The system of claim 6, wherein the transformer further comprises:

a coil; and a plurality of output taps coupled to the coil, wherein each of the plurality of output taps is coupled to at least one of the plurality of output terminals.

12. The system of claim 11, wherein the transformer further comprises a core coupled to the coil, wherein at least a portion of the coil is disposed along a circumference of the core.

13. A computing device comprising:

one or more processors; and memory storing instructions that, when executed by the one or more processors, cause the computing device to:

determine a power requirement of a user device;

determine, based at least on the power requirement of the user device, one of a plurality of output terminals of a transformer, wherein each of the output terminals of the transformer is associated with a different voltage; and cause output, to the user device and via the determined one of the plurality of output terminals, of a signal.

14. The computing device of claim 13, wherein the one of the plurality of output terminals is determined based at least on a distance between the user device and the transformer.

15. The computing device of claim 14, wherein the one of the plurality of output terminals is determined based at least on a length of a coupling between the user device and the transformer.

16. The computing device of claim 13, wherein the instructions, when executed, cause the computing device to:

receive, via the determined one of the plurality of output terminals, a first signal having a first voltage; and output, to the user device and based on the power requirement of the user device, a second signal having a second voltage different than the first voltage.

17. The computing device of claim 16, wherein the second voltage is less than the first voltage.

18. The computing device of claim 16, wherein the first voltage comprises the voltage associated with the determined one of the plurality of output terminals, and wherein the second voltage complies with a voltage threshold associated with the user device.

19. The computing device of claim 13, wherein the power requirement of the user device comprises a voltage threshold associated with the user device.

20. The computing device of claim 19, wherein the voltage associated with the determined one of the plurality of output terminals complies with the voltage threshold of the user device.

* * * * *